US010491147B2

(12) United States Patent
Judge et al.

(10) Patent No.: US 10,491,147 B2
(45) Date of Patent: Nov. 26, 2019

(54) DUAL ALTERNATOR VEHICLE POWER MANAGEMENT

(71) Applicant: Ford Global Technologies, LLC, Dearborn, MI (US)

(72) Inventors: Alan Francis Judge, Farmington Hills, MI (US); Gabriel Jim, Canton, MI (US); Jeffrey Raymond Mohr, Shelby Township, MI (US); James Brian Keyse, Farmington Hills, MI (US); Anthony Thomas Spoto, Birmingham, MI (US); John G. Fraser, St. Joachim (CA)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/826,326

(22) Filed: Nov. 29, 2017

(65) Prior Publication Data

US 2019/0165710 A1 May 30, 2019

(51) Int. Cl.
*H02P 9/10* (2006.01)
*H02P 9/48* (2006.01)
*B60L 1/00* (2006.01)
*B60R 16/03* (2006.01)
*H02P 5/00* (2016.01)

(52) U.S. Cl.
CPC ............. *H02P 9/102* (2013.01); *B60L 1/00* (2013.01); *B60R 16/03* (2013.01); *H02P 5/00* (2013.01); *H02P 9/48* (2013.01)

(58) Field of Classification Search
CPC ... H02P 9/102; H02P 9/48; B60L 1/00; B60R 16/03
See application file for complete search history.

(56) References Cited

U.S. PATENT DOCUMENTS

| 5,023,539 | A | 6/1991 | Miller et al. |
| 5,166,538 | A | 11/1992 | Norton |
| 5,663,632 | A * | 9/1997 | Roseman ............... H02P 9/08 322/28 |
| 6,239,996 | B1 * | 5/2001 | Perreault ............... B60L 3/003 363/89 |
| 7,656,134 | B2 | 2/2010 | Lybbert |

(Continued)

FOREIGN PATENT DOCUMENTS

KR 101668661 B1 10/2016

OTHER PUBLICATIONS

Vahe Caliskan, *A Dual/High-Voltage Automotive Electrical Power System With Superior Transient Performance*, 3 pages.

*Primary Examiner* — Viet P Nguyen
(74) *Attorney, Agent, or Firm* — Frank Lollo; Eversheds Sutherland (US) LLP

(57) ABSTRACT

System and method are disclosed for power management in a vehicle having two or more alternators. An example vehicle power system includes first and second alternators, and a processor. The processor is configured to determine that a load coupled to the first and second alternators increases at greater than a threshold rate. The processor is also configured to responsively (i) reduce respective voltage setpoints of the first and second alternators, and (ii) turn off the second alternator. And the processor is further configured to, after determining that a voltage transient caused by the load has expired, turn on the second alternator.

16 Claims, 3 Drawing Sheets

(56) References Cited

U.S. PATENT DOCUMENTS

| | | | | |
|---|---|---|---|---|
| 7,782,023 B2* | 8/2010 | Holguin | ............... | H02J 7/1423 |
| | | | | 307/57 |
| 2005/0280400 A1* | 12/2005 | Ooiwa | ................... | H02P 9/307 |
| | | | | 322/28 |
| 2006/0208710 A1* | 9/2006 | Velhner | .................. | H02P 9/102 |
| | | | | 322/58 |
| 2007/0169383 A1 | 7/2007 | McDaniel et al. | | |
| 2009/0261599 A1* | 10/2009 | Alston | ............... | B60L 15/2045 |
| | | | | 290/40 B |
| 2010/0033141 A1* | 2/2010 | Hu | ........................ | H02P 9/102 |
| | | | | 322/27 |
| 2010/0038969 A1* | 2/2010 | Hu | ........................ | H02P 9/102 |
| | | | | 307/84 |
| 2013/0271878 A1* | 10/2013 | Maddali | .................. | H02P 9/10 |
| | | | | 361/20 |
| 2015/0333680 A1* | 11/2015 | Delevski | ................ | H02P 9/107 |
| | | | | 322/63 |
| 2017/0033717 A1 | 2/2017 | Ansbacher et al. | | |
| 2018/0034280 A1* | 2/2018 | Pedersen | .................. | H02J 5/00 |

* cited by examiner

DUAL ALTERNATOR VEHICLE POWER MANAGEMENT

TECHNICAL FIELD

The present disclosure generally relates to vehicles having two alternators and, more specifically, dual alternator vehicle power management.

BACKGROUND

Modern vehicles may include an alternator used to convert mechanical energy to electrical energy in the form of a current. The alternator may be configured such that the current may be a direct current (DC) or an alternating current (AC). An alternator may include a rotor configured to create a rotating magnetic field and a stator configured to capture the magnetic field and convert the rotational energy of the rotating magnetic field to an AC or DC current. Alternators may be self-regulating in that the amount of power that the vehicle requires to satisfy various load causes the alternator output to automatically adjust itself for any given output voltage. However, because the alternator is a mechanical device made up of, among other things, a rotor and stator windings, it is sensitive to large load disturbances being turned on and off. When a load is quickly removed, the alternator has a period of time where the inertia of the system will cause the alternator to continue producing the voltage needed to run the load even with the load being disconnected from the system.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle power management for a system including two or more alternators, and a load. An example disclosed vehicle power system includes first and second alternators, and a processor. The processor is configured to determine that a load coupled to the first and second alternators increases at greater than a threshold rate. The processor is also configured to responsively (i) reduce respective voltage setpoints of the first and second alternators, and (ii) turn off the second alternator. And the processor is further configured to, after determining that a voltage transient caused by the load has expired, turn on the second alternator.

An example disclosed method for vehicle power system control includes determining, by a processor, that a load coupled to first and second alternators increases at greater than a threshold rate. The method also includes responsively (i) reducing respective voltage setpoints of the first and second alternators, and (ii) turning off the second alternator. And the method further includes, after determining that a voltage transient caused by the load has expired, turning on the second alternator.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
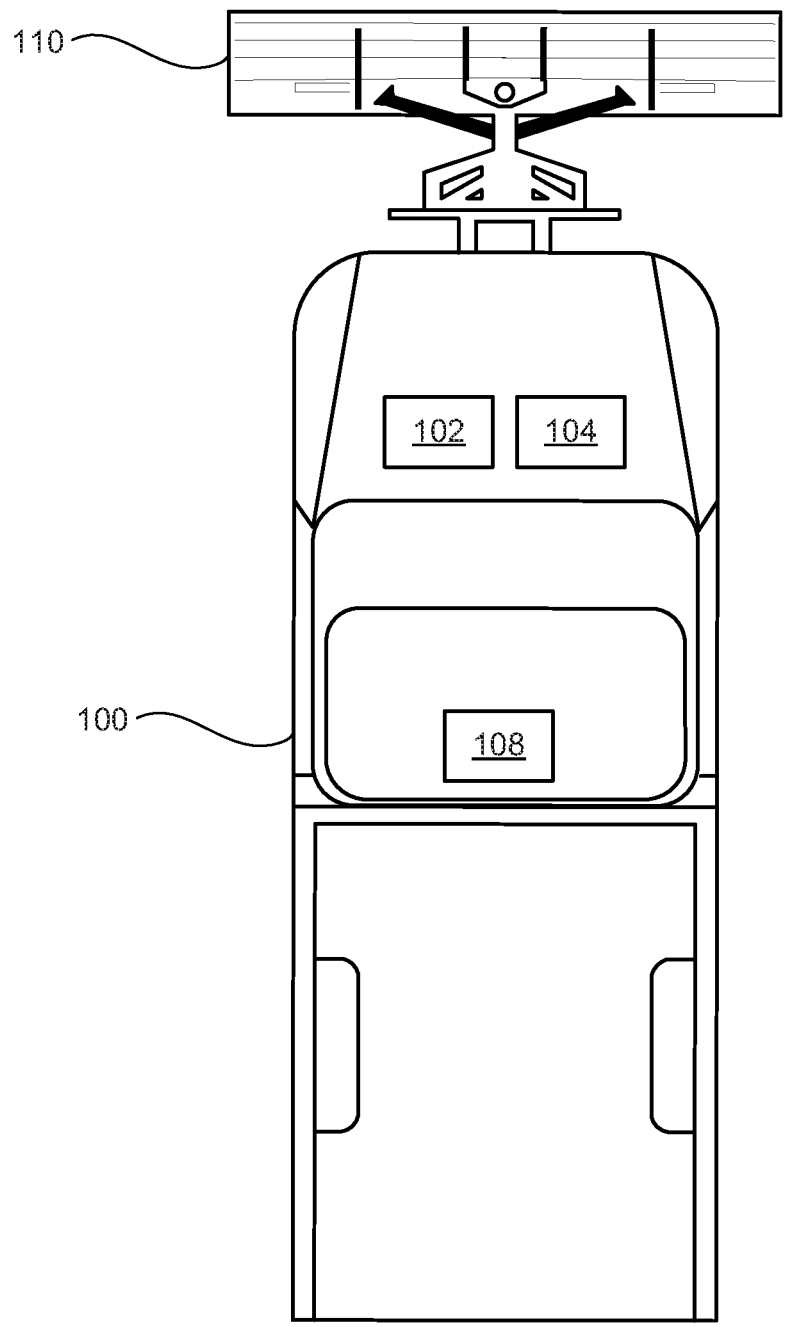
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to vehicle power management, and, more specifically, systems and methods for managing power consumption in a vehicle having two or more alternators and one or more loads that may require a relatively large amount of power.

In some examples, a vehicle may operate one or more alternators to provide power to one or more vehicle loads. The alternators may automatically adjust themselves to provide an appropriate output voltage to the loads. But in making various adjustments, and due to the mechanical nature of the alternators, voltage transients or voltage spikes may occur when rapid changes occur in the power system. For instance, when a large load is turned on and/or off, the output voltage of the alternators may spike. Various loads may be sensitive to the voltage spikes or transients, such that one or more loads may shut down, generate a warning signal, or otherwise operate abnormally. This can cause the driver to experience warning lights, loss of control of one or more vehicle systems, and otherwise have a negative driving experience.

With the issues above in mind, example embodiments of the present disclosure may include detecting when an issue will arise on the power system, carrying out one or more actions in order to mitigate or prevent adverse effects from the voltage transient, and returning the vehicle power system to normal operation. The typical scenario may involve a vehicle such as a snow plow, that includes a plow that may draw a high current during movement of the blade. When the plow is moved or oriented, the current draw may be large, causing the vehicle alternators to increase their output to provide the appropriate current and maintain the proper voltage. When the blade stops moving, the current draw from the load may decrease sharply or immediately. And because the alternators cannot immediately compensate for the reduced load (due to their mechanical nature), the voltage output may sharply increase for a brief time (i.e., a voltage transient), causing one or more vehicle systems to experience an overvoltage.

In order to compensate and mitigate the overvoltage effects, example embodiments may first detect that a load drawing current from the alternators has increased at a threshold rate. This may be an indication that a large load has been added to the system, and that there is likely to be a voltage transient in the future when the load is turned off or rapidly reduced. In particular examples, this may occur when a snow plow blade is moved over a short time period such as a few seconds, as noted above. After determining that there is likely to be a transient when the load is turned off, the vehicle may responsively reduce a voltage setpoint of the first and/or second alternators (i.e., from 14.5V to 12.5V). This can act to reduce the starting point of the voltage when the transient occurs, such that rather than jumping from 14.5V to 16.5V the system instead jumps from 12.5V to 14.5V, for example.

The vehicle may also turn off or remove all but the primary or first alternator from the power system. This can act to reduce the amount or magnitude of the voltage transient. For example, a single alternator may produce a voltage transient of two or three volts, while a dual alternator system may produce a voltage transient of five or six volts, which may cause greater issues than the smaller single alternator transient. These values are for illustrative purposes only, and various other values can be used as well.

The vehicle may then wait a pre-determined period of time, or may otherwise determine that the voltage transient has passed. This can include determining that the load has been disconnected for a given period of time, or otherwise determining that the voltage spike has been mitigated or factored into the alternator output (e.g., by reducing the alternator output). At this point, the vehicle may then turn on or reconnect the second or other non-primary alternators, and increase the voltage setpoints back to their initial values for normal operation.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a first or primary alternator 102, a second or non-primary alternator 104, a processor 108, and a vehicle accessory or load 110.

Alternators 102 and 104 may be configured to provide electrical power via current and voltage to one or more vehicle loads, such as load 110. As such, alternators 102 and 104 may be electrically coupled to various vehicle systems and loads. A multi-alternator system including two (or more) alternators may provide increased power output which may be particularly useful for vehicles that include power intensive loads, such as a snow plow, winch, search light, or other power intensive accessory. A single alternator may be configured to provide an output voltage up to 14.5V or more, with an output current maximum of around 150 A. These numbers are representative only, and many other voltages and currents are possible. In some examples, the output of a given alternator may depend on the revolutions per minute (RPM) of the engine. AS such, in order to provide a higher voltage or current, the alternator may require a greater engine RPM. A dual alternator system may be configured to provide a similar voltage to a single alternator system, while providing a greater amount of current.

An unfortunate byproduct of a dual alternator system may be that a voltage transient can be much higher (e.g., momentarily increasing the alternator output voltage from 14.5V to 18V or more, rather than from 14.5V to 16V, for example). These transients must be accounted for and mitigated to avoid errors or warnings, shutting off one or more loads, or otherwise causing abnormal operation of the various vehicle systems.

Processor 108 may be configured account for these voltage transients by taking one or more actions with respect to alternators 102 and 104, described herein. Processor 108 may be configured to control one or more aspects of first and second alternators 102 and 104. For example, processor 108 may change the respective alternator setpoints of the first and second alternators. A setpoint may be a voltage target for the alternator to output, and/or that the alternator automatically adjusts to output when the output voltage changes due to loads turning on or off and drawing more or less current.

Processor 108 may also be configured to monitor one or more alternator output characteristics, such as current and voltage. These characteristics may be monitored over time as well. Processor 108 may further monitor one or more load characteristics, such as current draft, voltage drawn, resistance, and more.

In some examples, processor 108 may determine that a load coupled to the first and second alternators increases at greater than a threshold rate. The threshold rate may comprise a change in load resistance over a period of time. This change may indicate that a large load has been added to the system in a short amount of time, which may correspond to a spike in the current drawn from the alternators.

During normal operation of the vehicle, one or more loads may be added and/or removed from the power system. This can include various fans, pumps, lights, etc. Some loads may require more power than others. As such, determining that the load on the power system has increased by greater than a threshold rate may include determining that a large resistance has been added to the system in a short period of time. This may indicate that a power intensive load such as the now plow 110 has been added to the power system and will be drawing power from the alternators. The cumulative resistance of many smaller loads added the system may be greater in an absolute sense than the resistance of load 110. However if the increased resistance from the many smaller loads is added over a long enough period of time, it will not trigger the actions described herein, as a voltage transient is not likely to result unless a large proportion of the many smaller loads are all shut off simultaneously (which is not likely to occur).

In some examples, processor 108 may determine that a large load has been added to the power system by receiving an indication or message from the load itself, from the CAN bus, or from another vehicle system or device. Processor 108 may monitor the status of various vehicle loads and determine that one or more loads are large enough that when they are turned on or added to the power system, one or more of the various actions described herein should be taken to mitigate the impending or expected voltage transient.

In some examples, the load itself may predict that a change in load status (e.g., from off to on) is likely to occur, and may responsively provide an indication to the processor 108. The load may predict this based on one or more inputs from a user or one or more sensors, for example.

Processor may determine that a voltage transient is expected based on the increase in the load resistance being greater than the threshold rate, based on a message or indication from the load, one or more vehicle sensors, based on a determination that the load has been turned on or added to the system, or based on one or more other indications.

Responsive to determining that the load coupled to the first and second alternators has increased at greater than a threshold rate, the processor 108 may be configured to reduce the respective voltage setpoints for the first and second alternators, as well as any other alternators (such as in a three or more alternator system). As noted above, the voltage set points may be the target output voltage of a given alternator. The alternator may automatically adjust one or more settings or operative characteristics to modify the output voltage to remain as close to the voltage setpoint as possible.

Reducing the voltage setpoint may preemptively lower the output voltage, such that when a voltage transient occurs, the peak voltage of the voltage transient is lower even if the transient has the same amplitude, as compared with an alternator having a higher voltage setpoint.

In some examples, reducing the setpoints of the first and second alternators may include reducing the setpoint of each alternator to a different level, such that the first alternator is reduced to a first setpoint and the second alternator is reduced to a second setpoint. The first and second setpoints may be the same or they may be different.

Processor 108 may also be configured to turn off the second alternator, and/or any additional non-primary alternators, responsive to determining that the load has increased at greater than the threshold rate. This can include disconnecting the second alternator, disconnecting an output of the second alternator, further reducing a setpoint of the second alternator to zero, or otherwise taking one or more actions to prevent the second alternator from providing power to the load. In some examples, there may be a time delay between when the processor 108 reduces the voltage setpoints of the first and second alternators, and when the processor turns off the second alternator.

After the second alternator has been turned off, the processor 108 may be configured to determine that a voltage transient caused by the load has expired. This may include determining that the load has decreased by greater a threshold rate. The threshold rate here may be a second threshold rate, which may be similar or identical to the first threshold rate described above with respect to the step of determining that a load has been added to the system.

After determining that the voltage transient has expired or passed, the processor 108 may be configured to turn on the second alternator (and any other non-primary alternators). This may include controlling the alternator to resume operation at the voltage setpoint to which it was previously set, or another voltage setpoint. In some examples, the second alternator may be configured to resume operation at the voltage setpoint it was set to prior to being turned off.

In some examples, the processor 108 may further be configured to increase the respective voltage setpoints of the first and second alternators after turning on the second alternator. This may be done over a period of time, gradually increasing the voltage setpoints. Alternatively, the voltage setpoints may be quickly or immediately increased to higher respective levels (e.g., 14.5V) after the second alternator is turned back on.

Figure 2:
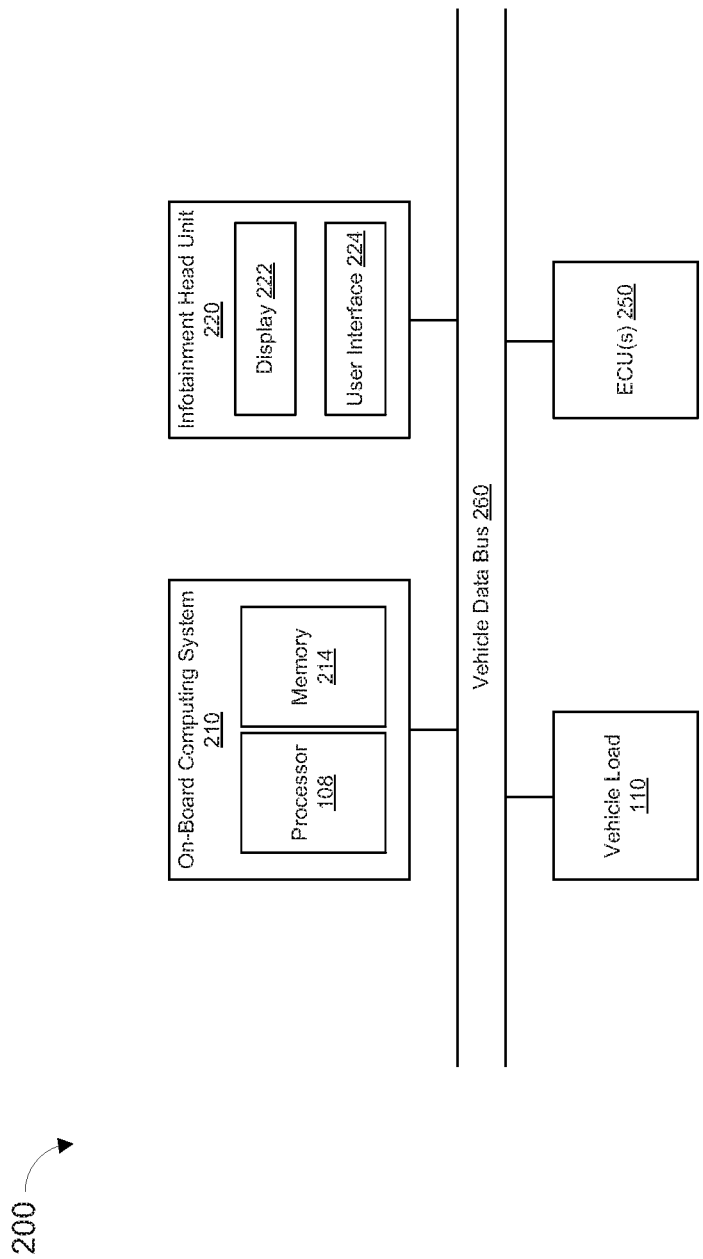
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 210, infotainment head unit 220, vehicle load 110, electronic control unit(s) 250, and vehicle data bus 260.

The on-board computing system 210 may include a microcontroller unit, controller or processor 108 and memory 214. The processor 108 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 108 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 210. Additionally, the infotainment head unit 220 may display the infotainment system on, for example, a center console display of vehicle 100.

Vehicle load 110 may be a snow plow (as in FIG. 1), but may alternatively include other vehicle accessories such as winches, lights, and other power intensive systems or devices. Load 110 may be configured to operate in an accessory mode, in which one or more functions, abilities, or actions are available to the accessory. This may include moving, changing the angle, raising, lowering, or powering the plow blade and/or lights of the accessory. Other functions are possible as well.

The ECUs 250 may monitor and control subsystems of vehicle 100. ECUs 250 may be the electrical load 110 discussed with reference to FIG. 1. As such, one or more ECUs may be enabled, disabled, or otherwise modified to reduce a power draw of the ECU. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. ECUs 250 may include a telematics control unit, a body control unit, and a speed control unit, for example.

Vehicle data bus 260 may include one or more data buses that communicatively couple the on-board computing system 210, infotainment head unit 220, vehicle load 110, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
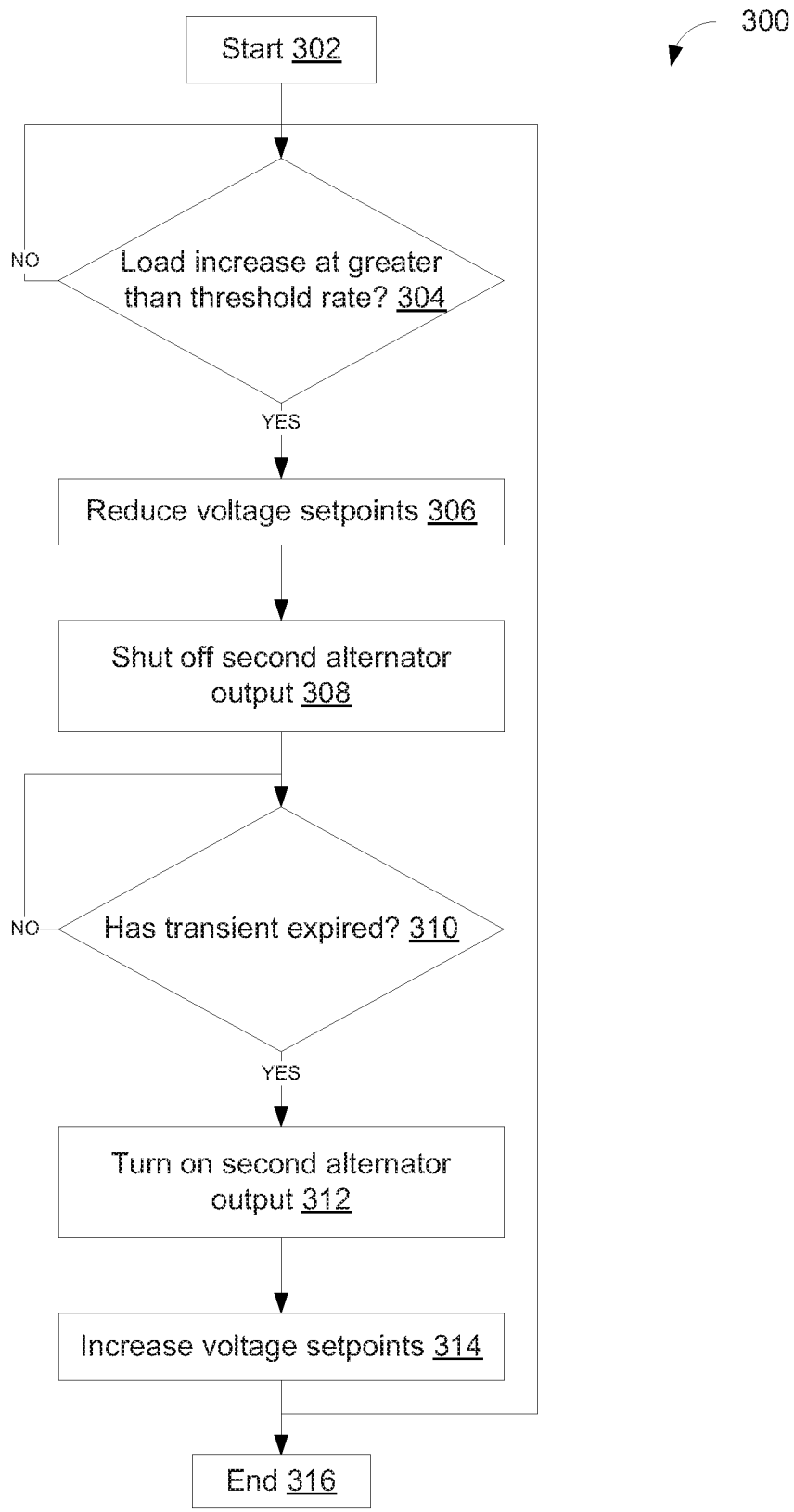
FIG. 3 illustrates a flowchart of an example method according to embodiments of the present disclosure.

FIG. 3 illustrates a flowchart of an example method 300 according to embodiments of the present disclosure. Method 300 may enable a vehicle power system to manage the output of two or more alternators in order to mitigate issues caused by voltage transients. The flowchart of FIG. 3 is representative of machine readable instructions that are stored in memory (such as memory 214) and may include one or more programs which, when executed by a processor (such as processor 108) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining whether a load of the vehicle has increased at greater than a threshold rate. If the load has not increased, method 300 may continue with block 304 waiting until the load has increased at greater than the threshold rate. The threshold rate may be a given amount of resistance over a period of time.

At block 306, method 300 may include reducing one or more voltage setpoints. For instance, this may include reducing the voltage setpoint of the first and second alternators from 14.5V down to 12.5V. Other setpoints may be used as well.

At block 308, method 300 may include shutting off the second alternator output. This may include preventing the second alternator from providing power to the load, so as to limit the voltage transient that may occur when the load is removed from the system.

AT block 310, method 300 may include determining whether the voltage transient has expired. This may be done by determining that the load has decreased at greater than a threshold rate (e.g., the inverse of block 304). If the voltage transient has not expired, method 300 may include waiting at block 310 until the transient has expired.

At block 312, method 300 may include turning on the second alternator output. This may include resuming operation of the second alternator at the reduced voltage setpoint set at block 306.

At block 314, method 300 may include increasing the voltage setpoints of the first and second alternators. Method 300 may then return back to block 304 to determine whether another cycle of increased load is occurring. Alternatively, method 300 may end at block 316.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle power system comprising:
   first and second alternators; and
   a processor configured to:
   determine that a load coupled to the first and second alternators increases at greater than a threshold rate;
   determine, based on the load increasing at greater than the threshold rate, that a voltage transient is expected;
   responsively (i) reduce respective voltage setpoints of the first and second alternators, and (ii) turn off the second alternator, wherein the first alternator is reduced to a first voltage setpoint, and the second alternator is reduced to a second voltage setpoint; and
   after determining that the voltage transient caused by the load has expired, turn on the second alternator by resuming operation of the second alternator at the second voltage setpoint.

2. The vehicle power system of claim 1, wherein the load comprises a snow plow.

3. The vehicle power system of claim 1, wherein the threshold rate comprises a change in the load resistance over a period of time.

4. The vehicle power system of claim 1, wherein the processor is further configured to determine that the load coupled to the first and second alternators increases at greater than the threshold rate by receiving an indication that the load is expected to increase at greater than the threshold rate.

5. The vehicle power system of claim 4, wherein the load is configured to provide the indication to the processor.

6. The vehicle power system of claim 5, wherein the load is further configured to predict a change in load status, and responsively provide the indication to the processor.

7. The vehicle power system of claim 1, wherein the processor is further configured to increase the respective voltage setpoints of the first and second alternators after turning on the second alternator.

8. The vehicle power system of claim 1, wherein the threshold rate is a first threshold rate, and wherein determining that the voltage transient caused by the load has expired comprises determining that the load decreases at greater than a second threshold rate.

9. A method for vehicle power system control comprising:
  determining, by a processor, that a load coupled to first and second alternators increases at greater than a threshold rate;
  determining, based on the load increasing at greater than the threshold rate, that a voltage transient is expected;
  responsively (i) reducing respective voltage setpoints of the first and second alternators, and (ii) turning off the second alternator, wherein the first alternator is reduced to a first voltage setpoint, and the second alternator is reduced to a second voltage setpoint; and
  after determining that the voltage transient caused by the load has expired, turning on the second alternator by resuming operation of the second alternator at the second voltage setpoint.

10. The method of claim 9, wherein the load comprises a snow plow.

11. The method of claim 9, wherein the threshold rate comprises a change in the load resistance over a period of time.

12. The method of claim 9, further comprising:
  determining that the load coupled to the first and second alternators increases at greater than the threshold rate by receiving an indication that the load is expected to increase at greater than the threshold rate.

13. The method of claim 12, wherein the load is configured to provide the indication to the processor.

14. The method of claim 13, wherein the load is further configured to predict a change in load status, and responsively provide the indication to the processor.

15. The method of claim 9, further comprising increasing the respective voltage setpoints of the first and second alternators after turning on the second alternator.

16. The method of claim 9, wherein the threshold rate is a first threshold rate, and wherein determining that the voltage transient caused by the load has expired comprises determining that the load decreases at greater than a second threshold rate.

* * * * *